(12) United States Patent
Koenen et al.

(10) Patent No.: US 8,516,985 B2
(45) Date of Patent: *Aug. 27, 2013

(54) PUSH BUTTON STARTING SYSTEM FOR OUTDOOR POWER EQUIPMENT

(75) Inventors: Robert J. Koenen, Pewaukee, WI (US); Stephen J. Ryczek, Hartland, WI (US); Bruce S. Lydy, Germantown, WI (US); Erik R. Slegelis, Port Washington, WI (US); Steven J. Weber, Germantown, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/450,528

(22) Filed: Apr. 19, 2012

(65) Prior Publication Data

US 2012/0199089 A1    Aug. 9, 2012

Related U.S. Application Data

(63) Continuation of application No. 12/622,101, filed on Nov. 19, 2009, now Pat. No. 8,171,907.

(51) Int. Cl.
*F02N 11/08* (2006.01)

(52) U.S. Cl.
USPC ............. 123/179.3; 200/43.13; 200/43.18; 200/341

(58) Field of Classification Search
USPC ............. 123/179.3, 179.4, 179.24, 179.25, 123/185.1; 200/43.03, 43.09, 43.13, 43.18, 200/341; 307/10.3, 10.6
See application file for complete search history.

(56) References Cited

U.S. PATENT DOCUMENTS

| | | | |
|---|---|---|---|
| 3,985,196 A | 10/1976 | Deschamps | |
| 4,051,915 A | 10/1977 | Behrens | |
| 4,279,179 A | 7/1981 | Marto | |
| D345,166 S | 3/1994 | Kamlukin et al. | |
| 5,491,470 A * | 2/1996 | Veligdan | 340/5.6 |
| 5,934,051 A | 8/1999 | Hahn | |
| 6,351,703 B1 | 2/2002 | Avery, Jr. | |
| 6,354,388 B1 | 3/2002 | Teal et al. | |
| 6,454,032 B1 | 9/2002 | Teal et al. | |
| 6,470,660 B1 | 10/2002 | Buss et al. | |
| 6,591,803 B2 | 7/2003 | Chang | |
| 6,609,357 B1 | 8/2003 | Davis et al. | |
| 7,071,436 B2 | 7/2006 | Coates | |
| 7,089,721 B2 | 8/2006 | Turner et al. | |
| 7,091,629 B2 | 8/2006 | Hawkins | |
| 7,679,491 B2 * | 3/2010 | Costello et al. | 340/426.3 |
| 8,063,505 B2 * | 11/2011 | Pfohl et al. | 307/10.3 |

(Continued)

*Primary Examiner* — Hai Huynh
(74) *Attorney, Agent, or Firm* — Andrus, Sceales, Starke & Sawall, LLP

(57) ABSTRACT

A starting system for outdoor power equipment that has a controller and a start button to control the activation of an internal combustion engine. The starting system includes a controller that receives a start signal from a start button. The controller monitors for the presence of an enable device in an enable device receptacle and, upon activation of the start button and the presence of the enable device in the enable device receptacle, the controller provides electric power to the electric load of the power equipment. When the start button is depressed for longer than a minimum engagement period, the controller initiates operation of the engine. If the start button is pressed for less than the minimum engagement period, the controller activates the electric load for an auxiliary period without starting the engine. During engine operation, if the start button is depressed, the controller terminates operation of the engine.

16 Claims, 4 Drawing Sheets

(56) References Cited

U.S. PATENT DOCUMENTS

| | | | |
|---|---|---|---|
| 8,171,907 B2 * | 5/2012 | Koenen et al. | 123/179.3 |
| 2005/0024195 A1 | 2/2005 | Bai | |
| 2009/0064957 A1 | 3/2009 | Grybush | |
| 2010/0132647 A1 * | 6/2010 | Dietrich | 123/179.3 |
| 2011/0118961 A1 | 5/2011 | Koenen et al. | |
| 2011/0264315 A1 * | 10/2011 | Blind et al. | 701/22 |

* cited by examiner

PUSH BUTTON STARTING SYSTEM FOR OUTDOOR POWER EQUIPMENT

CROSS-REFERENCE TO RELATED APPLICATION

The present application is a continuation of U.S. patent application Ser. No. 12/622,101, filed on Nov. 19, 2009, priority to which is claimed and the subject matter of which is incorporated herein by reference.

BACKGROUND OF THE INVENTION

The present disclosure generally relates to a starting system for an internal combustion engine. More specifically, the present disclosure relates to a push button starting system for the internal combustion engine of a piece of outdoor power equipment, such as a lawn tractor, walk behind mower, pressure washer, portable electric generator, snow blower or the like. The push button starting system requires both the presence of an enable device, such as a key fob, and depression of a start button to begin operation of the internal combustion engine.

Currently available outdoor power equipment, such as lawn tractors, walk behind mowers and the like, include an internal combustion engine that provides both the motive force for the power equipment and the required power to rotate a cutting blade. Typically, the internal combustion engine of the power equipment, such as a lawn tractor, is started by inserting a key into an ignition switch. Once the key is inserted into the ignition switch, the key is turned to crank the internal combustion engine. Typically, the key remains in the cranking position until the engine turns over and begins running. Once the engine has started, the operator releases the key from the cranking position and the engine continues operation.

Although an ignition switch and key have been a successful way to start the internal combustion engine of a lawn tractor for many years, drawbacks exist for inexperienced users who may not feel comfortable with the procedures required to start the internal combustion engine. As an example, many inexperienced users are unclear as to how long the engine needs to crank when the engine is initially slow to start.

In addition to the drawbacks set forth above, lawn tractors that include an ignition switch and key may allow the operator to turn the key partially toward the cranking position. In this intermediate, auxiliary position, electric power from the vehicle battery is supplied to the electronics load of the lawn tractor, such as the headlights and other electrical components contained on the lawn tractor. The use of the auxiliary position is particularly beneficial when the operator does not want to start the engine but simply wants to operate the electrical components contained on the tractor. Although the auxiliary position is beneficial, if the ignition key is left in the auxiliary position for an extended period of time, the electric load will eventually drain the battery of the lawn tractor, thus rendering the lawn tractor inoperable without either replacing or recharging the battery.

SUMMARY OF THE DISCLOSURE

The present disclosure provides a push button starting system for the internal combustion engine of outdoor power equipment, such as but not limited to a lawn tractor. The push button starting system requires both the presence of an enable device in an enable device receptacle and depression of a start button to begin operation of the internal combustion engine.

The push button starting system of the present disclosure includes a controller that controls operation of many components of the lawn tractor, including the starting of the internal combustion of the lawn tractor. The controller initiates operation of the internal combustion engine of the lawn tractor by closing the contacts of a starter solenoid relay to crank the engine.

A start button is connected to the controller and generates a start signal sensed by the controller when the start press button is in the activated position. In one embodiment of the disclosure, the start button is a push button that is activated by depressing and holding the push button. The controller receives the start signal during the entire time the start button is in the activated state.

When the controller receives the start signal, the controller awakens from a sleep mode and checks to determine whether an enable device is in an enable device receptacle of the lawn tractor. If the enable device is not in the enable device receptacle, the controller returns to the sleeping mode.

If the controller determines that the enable device is in the enable device receptacle after receiving the start signal, the controller energizes a load relay which provides electric power to the electric load of the lawn tractor. After the load relay is energized, the controller starts an auxiliary period timer. The controller provides electric power to the electric load of the lawn tractor for only an auxiliary period. In one embodiment of the disclosure, the auxiliary period is two minutes. In this manner, the operator can power the electric load of the lawn tractor by depressing and releasing the start button.

The controller then determines if the start signal was received for greater than a minimum engagement period. If the start signal was received for less than the minimum engagement period, the controller continues the auxiliary period timer and eventually de-energizes the load relay after the expiration of the auxiliary period.

If the controller senses the start signal for greater than the minimum engagement period, the controller determines whether an operator is present in the seat of the lawn tractor. If the operator is present in the seat, the controller can initiate operation of the internal combustion engine. However, if an operator is not present in the seat of the lawn tractor, operation of the internal combustion engine is delayed.

If the controller receives the start signal for greater than the minimum engagement period, determines that that enable device is present in the enable device receptacle and detects the presence of an operator in the seat of the lawn tractor, the controller closes the contacts of a starter solenoid relay which initiates operation of the internal combustion engine. Once the internal combustion engine has started, the controller then monitors for the presence of the start signal due to a subsequent depression of the start button. Once the controller detects the presence of the start signal, the controller opens the contacts of an ignition short relay to interrupt operation of the internal combustion engine.

In the push button starting system of the present disclosure, the controller can control operation of the electric load and starter solenoid only when the enable device is within the enable device receptacle. If the enable device is removed from the enable device receptacle, the enable device receptacle overrides the controller and prevents activation of the internal combustion engine. In this manner, the push button starting system of the present disclosure requires the enable device to be in the enable device receptacle and depression of the start button before the controller initiates operation of the internal combustion engine.

Various other features, objects and advantages of the invention will be made apparent from the following description taken together with the drawings.

BRIEF DESCRIPTION OF THE DRAWINGS

The drawings illustrate the best mode presently contemplated of carrying out the invention. In the drawings.

DETAILED DESCRIPTION OF THE DRAWINGS

The present disclosure is directed to a starting system for an internal combustion engine of outdoor power equipment, such as but not limited to a lawn tractor, walk-behind mower, pressure washer, portable electric generator, snow blower or other similar type of equipment. The drawings figures depict the use of the starting system with one type of equipment, namely a lawn tractor. However, it should be understood that the starting system could be utilized with other types of outdoor power equipment while falling within the scope of the disclosure and the claims.

Figure 1:
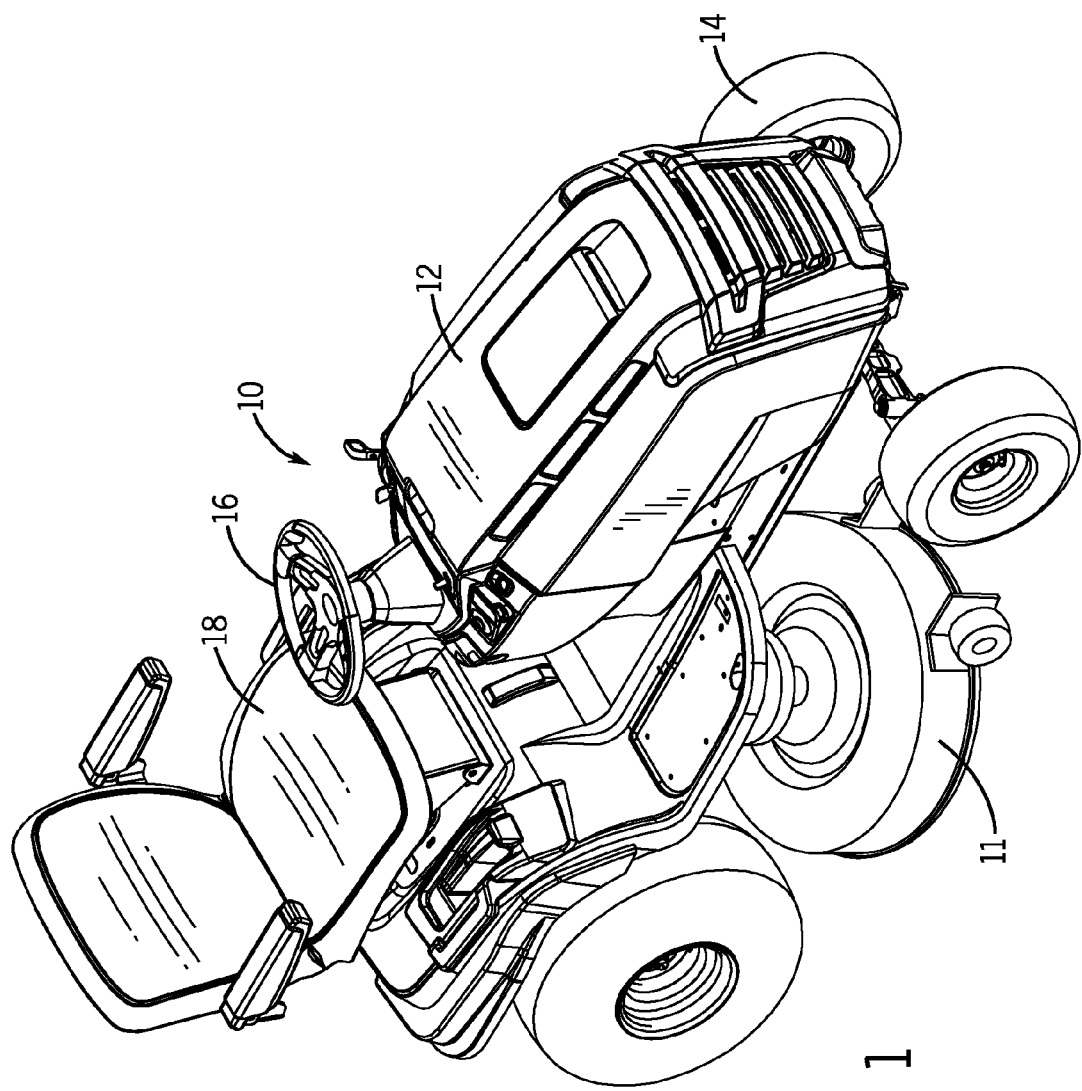
FIG. 1 is a perspective view of a lawn tractor including the push button starting system of the present disclosure.

FIG. 1 illustrates a riding lawn tractor 10 that typically includes a mowing assembly 11 mounted beneath a vehicle chassis 12 supported by four wheels 14. The lawn tractor 10 includes an internal combustion engine (not shown) that powers both the rear drive wheels and a mower blade contained within the mowing assembly 11. A steering wheel 16 allows an operator positioned in the seat 18 to control the movement of the lawn tractor 10, as is conventional. The details of the lawn tractor 10 shown in FIG. 1 are meant for illustrative purposes only since the lawn tractor 10 could have various different operator controls and physical configurations while falling within the scope of the present disclosure.

Figure 2:
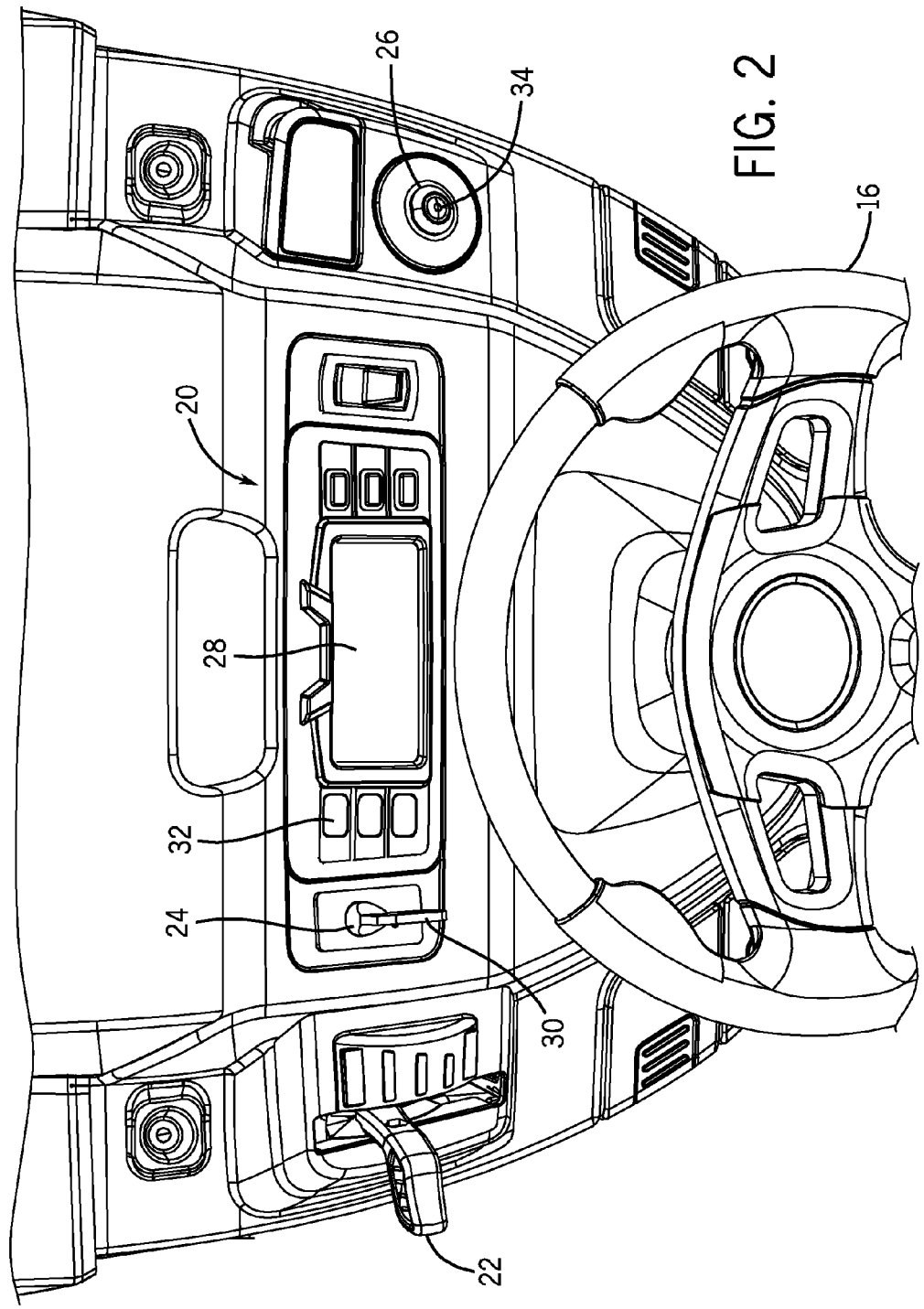
FIG. 2 is a magnified view of the dashboard of the lawn tractor including the push button starting system of the present disclosure.

FIG. 2 generally illustrates the dashboard 20 visible to the operator when the operator is in the seated position. The dashboard 20 includes the steering wheel 16, a speed selection handle 22, an enable device receptacle 24, a start button 26 and a display panel 28. Although these operating components are shown included on the dashboard 20, it should be understood that various other components could be utilized while operating within the scope of the present disclosure.

As illustrated in FIG. 2, the enable device receptacle 24 receives an enable device 30. The enable device 30 can be removed from the enable device receptacle 24 and carried with the operator when the lawn tractor is not in use. Removal of the enable device 30 from the enable device receptacle 24 will render the tractor inoperative, as will be described below. In contemplated embodiments of the disclosure, the enable device 30 could be any component that is received and detected by the enable device receptacle 24, such as a key fob received in a key fob receptacle. Likewise, the enable device receptacle 24 could be any type of receptacle that is capable of detecting the presence of the enable device 30. As an example, the enable device receptacle 24 could be a simple switch that moves from one position to another upon receipt of the enable device 30. Alternatively, the enable device 30 could include a magnetic section and the enable device receptacle 24 would detect the presence of the magnetic section. Various other alternate embodiments are contemplated as being within the scope of the present disclosure.

The display panel 28 is surrounded by six individual data entry buttons 32 that can be selectively depressed by the operator to provide input to the controller (not shown) used to operate the lawn tractor. As an example, information can be presented on the display panel 28 and the operator can depress one or more of the entry buttons 32 to provide inputs to the tractor controller.

In the embodiment shown in FIG. 2, the start button 26 is a push button having a visual indicator 34. The visual indicator 34 can be one of several different components, but in the illustrated embodiment the visual indicator 34 is an LED activated by the controller to indicate depression of the start button 26, as will be described in greater detail below. In the embodiment illustrated, the start button 26 is a push button that can be depressed and held in an activated position by the operator. The start button 26 is designed to allow the operator to initiate operation of the internal combustion engine of the lawn tractor upon depressing and holding the start button 26.

Figure 3:
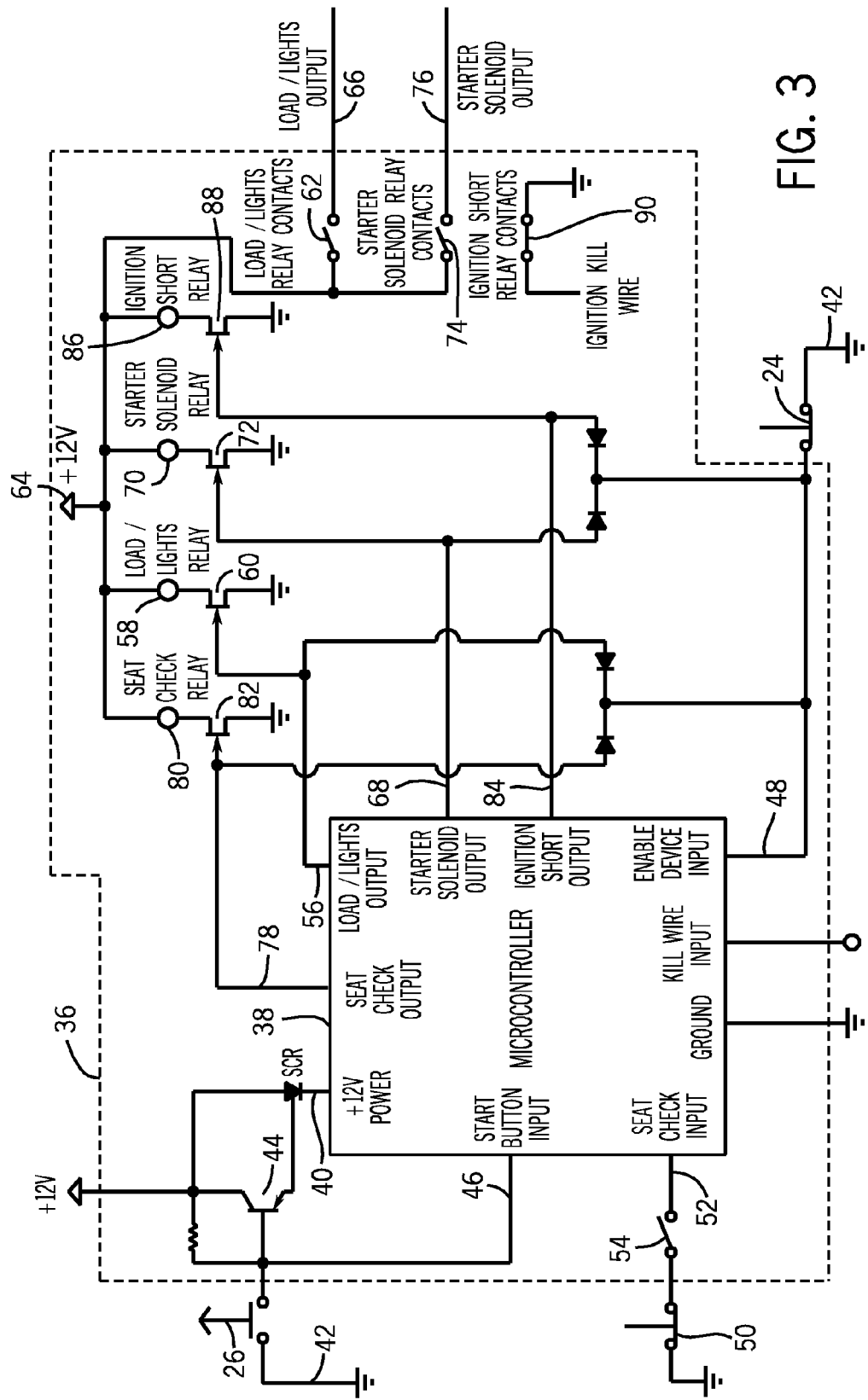
FIG. 3 is an electronic schematic illustration of the push button starting system of the present disclosure.

FIG. 3 illustrates the electronic components and the configuration for the starting system 36 of the present disclosure. As indicated previously, the starting system 36 includes a controller 38. In the embodiment shown in FIG. 3, the controller 38 is a microcontroller, such as and 8-bit 89LPC936, available from N×P Semiconductors. However, it is contemplated that other types of controllers could be utilized while operating within the scope of the present disclosure.

The controller 38 includes a power input pin 40 that is connected to the start button 26. The start button 26 is a normally open switch that is connected between ground 42 and a transistor 44. When the normally open start button 26 is activated, the start button 26 provides a path from the base of transistor 44 to ground. The ground connection provides a start signal to the controller 38 at the start button input pin 46. The start signal is provided at start button input pin 46 as long as the normally open start button 26 remains in its closed, depressed condition. The controller 38 monitors the duration of time the start signal is provided on the start button input pin 46, as will be described in greater detail below.

The controller 38 is further connected to the enable device receptacle 24. As indicated above, the enable device receptacle 24 could be a normally closed switch. During the normally closed condition, the enable device receptacle 24 provides a connection from the enable device input pin 48 to ground 42. When the enable device for the lawn tractor is inserted into the enable device receptacle 24, the normally closed enable device receptacle 24 opens, which is sensed by the controller 38 through the enable device input pin 48.

In the embodiment illustrated in FIG. 3, the controller 38 is also coupled to a seat switch 50. The seat switch 50 is positioned beneath the seat 18 of the lawn tractor 10, as shown in FIG. 1. When an operator is present in the seat 18, the seat switch 50 opens. However, when an operator is not present in the seat 18, the seat switch 50 remains in its normally closed condition. The status of the seat switch 50 can be determined on the seat check input pin 52.

The seat check input pin 52 is connected to a seat switch 50 through a seat check relay contacts 54. When the controller 38 desires to check the status of the seat switch, the controller 38 closes the seat check relay contacts 54. When the seat check relay contacts 54 are closed, the controller 38 can determine the status of the seat switch 50 through the seat check input pin 52.

The controller 38 includes a load output pin 56 that is coupled to a load relay 58 through a transistor 60. The load relay 58 includes normally open load relay contacts 62 connected between the 12-volt power supply 64 and the electrical load for the tractor present along output line 66. When the controller 38 desires to energize the electrical load for the lawn tractor, the controller 38 generates a signal along the load output pin 56. If the enable device is in the enable device receptacle 24, the signal present at the load output pin 56 activates the transistor 60, which in turn closes the normally open load relay contacts 62. However, if the enable device is not present in the enable device receptacle 24, the enable device receptacle 24 provides a path to ground 42 from the base of transistor 60. Thus, the controller 38 can only close the load relay contacts 62 when the enable device is in the enable device receptacle 24.

The controller further includes a starter solenoid output pin 68 that is connected to a starter solenoid relay 70 through a transistor 72. Once again, if the enable device is not present in the enable device receptacle 24, the base of the transistor 72 is connected to ground and the controller 38 cannot close the normally open starter solenoid relay contacts 74. However, if the enable device is present within the enable device receptacle 24, the controller 38 can close the normally open starter solenoid relay contacts 74 to provide power to the starter solenoid along output line 76.

Controller 38 further includes a seat check output pin 78 that is connected to the seat check relay 80 through the transistor 82. As discussed previously, when the enable device is not present within the enable device receptacle 24, the base of transistor 82 is grounded and the controller 38 cannot activate the seat check relay 80. However, when the enable device is within the enable device receptacle 24, the output signal generated by the controller 38 on the seat check output pin 78 causes the normally open seat check relay contacts 54 to move to a closed position.

Finally, the controller 38 includes an ignition short output pin 84 that is connected to an ignition short relay 86 through a transistor 88. Once again, when the enable device is not in the enable device receptacle 24, the base of transistor 88 is grounded through the enable device receptacle 24. However, when the enable device is inserted into the enable device receptacle 24, an output signal at the ignition short output 84 activates the ignition short relay, which causes the normally closed ignition short relay contacts 90 to move to an open position. When the ignition short relay contacts are in an open position, operation of the internal combustion engine is allowed, and when closed, engine operation is terminated.

Figure 4:
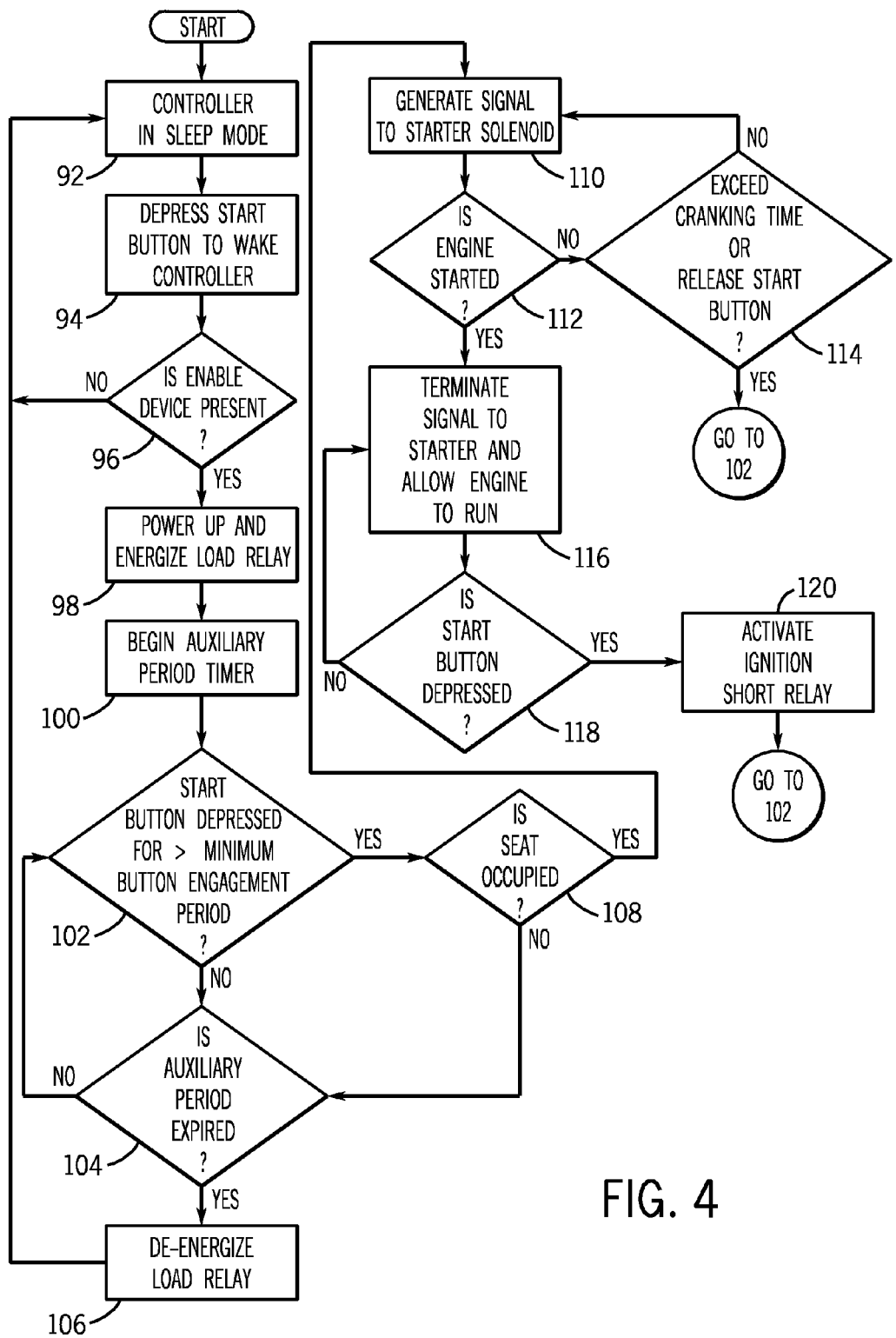
FIG. 4 is a flowchart illustrating one possible sequence of operation of the push-button starting system of the present disclosure.

The circuit schematic of FIG. 3 is one embodiment of the present disclosure. However, it is contemplated that other embodiments could be utilized while operating within the scope of the present disclosure. The actual operation of the controller will now be described with reference to FIG. 4.

Since the controller 38 shown in FIG. 3 is operated from the 12-volt power supply 64, it is desirable that the controller 38 remains in a "sleeping" mode during periods of non-use. It is particularly desirable that the controller 38 remain in a sleeping mode even when the enable device is placed in the enable device receptacle 24, since it is contemplated that many operators of the lawn tractor will allow the enable device to remain within the enable device receptacle 24 at all times.

As indicated in step 92, the controller 38 remains in the sleep mode until the controller 38 senses the depression of the start button 26, as indicated in step 94. When the controller 38 receives the start signal at the start button input pin 46, the controller 38 awakens and initially determines whether the enable device is in the enable device receptacle 24, as illustrated in step 96. If the controller determines in step 96 that the enable device is not present in the enable device receptacle, the controller returns to the sleep mode without ever activating the electric load for the lawn tractor. In this manner, activation of the electric load requires both the depression of the start button 26 and the presence of the enable device within the enable device receptacle 24.

If the controller determines in step 96 that the enable device is in the enable device receptacle, the controller energizes the load relay 58 in step 98. To do so, the controller generates a high signal on the load output pin 56, which in turn activates the transistor 60 and moves the normally open load relay contacts 62 to the closed condition. Activation of the electric load allows the operator to use the tractor headlights, view the display and operate any other electric components of the tractor.

After the electric load for the tractor has been energized, the controller starts the auxiliary period timer in step 100. After the auxiliary period timer is started, the controller determines in step 102 whether the start button 26 has been depressed for longer than a minimum engagement period. In one embodiment of the present disclosure, the controller 38 will not start the internal combustion engine unless the start button is depressed for longer than the minimum engagement period. As an example, the minimum engagement period could be 0.5 seconds, although other time periods are contemplated. The use of a minimum engagement period prevents inadvertent depression of the start button from beginning operation of the internal combustion engine. However, it is contemplated that the minimum engagement period should have a duration sufficiently small to prevent the operator from having to hold the start button in the depressed condition for an undesirably long period of time.

If the controller determines in step 102 that the start button was depressed for less than the minimum engagement period, the controller continues to count down the auxiliary period timer. The auxiliary period timer allows the controller to set an auxiliary period during which the electric load is supplied with electric power from the lawn tractor battery. In this manner, if the operator depresses the start button for a very brief period of time when the enable device is within the enable device receptacle, the controller 38 provides electric power to the electric load of the tractor for the auxiliary period. In the currently preferred embodiment, the auxiliary period is approximately two minutes, although other periods of time are contemplated as being within the scope of the present disclosure.

In step 104, the controller 38 determines whether the two minute auxiliary period has expired. If the auxiliary period has not expired, the timer continues to count until the auxiliary period has expired. Once the auxiliary period has expired, the controller de-energizes the load relay contacts 62, as illustrated in step 106. When the load relay contacts are de-energized and opened, electric power is interrupted to the electric load. After the electric power to the load is interrupted, the controller returns to the sleep mode, as illustrated in step 92. In this manner, the controller 38 provides electric power to the electric load, including the light for the lawn tractor, for the auxiliary period after the start button has been activated for less than the minimum engagement period. Thus, if the operator desires to operate the electric load of the tractor without actually initiating the engine operation, the operator can depress the start button 26 for less than the 0.5 second minimum engagement period.

If the controller determines in step 102 that the start button was depressed for longer than the minimum engagement period, the controller then determines in step 108 whether the seat of the lawn tractor is occupied. Referring back to FIG. 3, the controller 38 determines whether the seat is occupied by closing the seat check relay contacts 54. In the embodiment illustrated in FIG. 3, the controller only closes the seat check relay contacts when the controller 38 desires to determine the status of the seat switch 50.

If the controller determines in step 108 that the seat is not occupied, the controller determines whether the auxiliary period has expired, as illustrated in step 104. Since the controller 38 will not start the engine when the seat is unoccupied, the controller only activates the load relay 58 when the seat switch 50 is in the normally closed condition.

In an embodiment in which the starting system is utilized with outdoor power equipment other than a lawn tractor, the controller would not need to determine whether the seat is occupied. Instead, the controller could be configured to detect other conditions of the outdoor power equipment. As an illustrative example, if the starting system is used with a walk-behind mower, the controller would check on the position of a contact switch on the bail to ensure that the operator is away from the blade before cranking the engine. Similar conditions could be checked when the starting system is used with a snow blower.

However, if the controller determines in step 108 that the seat is occupied and the seat switch 50 is open, the controller 38 generates a signal to the starter solenoid relay 70, as illustrated in step 110. The signal to the starter solenoid relay 70 causes the normally open starter solenoid relay contacts 74 to close, thus providing electrical power to the starter solenoid along output line 76. The output signal is supplied to the starter solenoid until the engine begins operation. In step 112, the controller determines whether the engine has started. If the engine has not started, the controller determines in step 114 whether the cranking period has been exceeded or whether the start button has been released. As an example, the controller 38 will provide an output signal to the starter solenoid only for a maximum cranking period, such as 20 seconds, or until the user releases the start button. If the engine does not begin operation during this cranking period, the system returns to monitoring the start button and the auxiliary period timer in step 102.

If the controller determines in step 112 that the engine has started, the controller 38 terminates the signal to the starter solenoid relay contacts, which opens the contacts and allows the internal combustion engine to run in a normal manner, as illustrated in step 116. During operation of the internal combustion engine, the controller 38 continues to monitor for whether the start button has been depressed, as indicated in step 118. During normal operation of the internal combustion engine, if the start button 26 is depressed, this indicates that the operator wishes to stop operation of the internal combustion engine. When the start button is depressed in step 118, the controller 38 activates the ignition short relay contacts 90, as illustrated in step 120. When the ignition short relay contacts 90 are closed, operation of the internal combustion engine is interrupted.

As can be understood by the above description, the presence of the enable device within the enable device receptacle 24 opens a connection to ground. If the enable device is removed from the enable device receptacle 24, the removal of the enable device overrides the controller 38 and prevents the controller 38 from changing the condition of the load relay contacts 62, the starter solenoid relay contacts 74 and the ignition short relay contacts 90. Further, the removal of the enable device from the enable device receptacle 24 prevents the controller form closing the seat check relay contacts 54. In this manner, the enable device is an override for the controller 38. Thus, the enable device must be present for the controller to initiate activation of the internal combustion engine.

Although various contacts are described in the present disclosure as being in a normally open or normally closed condition, it is contemplated that various other configurations could be utilized while operating within the scope of the present disclosure.

We claim:

1. An engine control system for automatically starting an internal combustion engine of a lawn tractor, comprising:
   a start button positioned on the lawn tractor that generates a start signal upon activation;
   an enable device;
   an enable device receptacle positioned on the lawn tractor that detects the presence of the enable device; and
   a controller coupled to the start button and the enable device receptacle, wherein the controller enables starting of the internal combustion engine only when the enable device receptacle detects the presence of the enable device and the controller simultaneously receives the start signal.

2. The engine control system of claim 1 wherein the controller activates a starter for the internal combustion engine to enable starting of the engine.

3. The engine control system of claim 1 wherein the enable device receptacle detects the presence of the enable device near the enable device receptacle.

4. The engine control system of claim 1 wherein the enable device receptacle receives the enable device.

5. The engine control system of claim 1 wherein the start signal is continuously generated upon continued activation of the start button and the controller enables starting of the engine only when the controller receives the start signal for longer than a minimum engagement period.

6. The engine control system of claim 1 further comprising an ignition shorting relay coupled to the controller, wherein the controller activates the ignition shorting relay to interrupt operation of the engine upon receipt of the start signal when the engine is running.

7. The engine control system of claim 1 further comprising electric load coupled to the controller through a load relay, wherein the controller activates the load relay to provide power to the electric load only when the enable device receptacle detects the presence of the enable device and upon receipt of the start signal.

8. A method of automatically starting an engine of a lawn tractor, the method comprising the steps of:
   providing a controller for the lawn tractor;
   determining in the controller whether an enable device is in the presence of an enable device receptacle;
   upon determining that the enable device is in the presence of the enable device receptacle, monitoring for the activation of a start button;
   determining when the start button is activated for longer than a minimum engagement period; and
   starting the engine only when the start button is activated for longer than the minimum engagement period and the enable device receptacle detects the presence of the enable device.

9. The method of claim 8 further comprising the step of providing power to an electric load of the lawn tractor after determining that the enable device is in the presence of the enable device receptacle and the start button is activated.

10. The method of claim 9 wherein power is supplied to the electric load when the start button is activated for less than the minimum engagement period.

11. The method of claim 10 wherein the engine is not started and power is supplied to the electric load for an auxiliary period after the start button is activated for less than the minimum engagement period.

12. The method of claim 8 further comprising the step of interrupting the operation of the engine upon activation of the start button after the engine is started.

13. A push button starting system for a walk behind mower, comprising:
 a start button positioned on the walk behind mower that generates a start signal upon activation;
 an enable device;
 an enable device receptacle positioned on the walk behind mower that detects the presence of the enable device; and
 a controller coupled to the start button and the enable device receptacle, wherein the controller enables starting of the internal combustion engine only when the enable device receptacle detects the presence of the enable device and the controller simultaneously receives the start signal.

14. The push button starting system of claim 13 wherein the enable device receptacle detects the presence of the enable device near the enable device receptacle.

15. The push button starting system of claim 13 wherein the enable device receptacle receives the enable device.

16. The push button starting system of claim 13 wherein the start signal is continuously generated upon continued activation of the start button and the controller enables starting of the engine only when the controller receives the start signal for longer than a minimum engagement period.

\* \* \* \* \*